United States Patent [19]

Pitroda

[11] 4,257,119
[45] Mar. 17, 1981

[54] PCM SWITCHING SYSTEM FOR WIDE AND NARROW BAND SIGNALS

[75] Inventor: Satyan G. Pitroda, Villa Park, Ill.

[73] Assignee: Wescom Switching, Inc., Oak Brook, Ill.

[21] Appl. No.: 974,304

[22] Filed: Dec. 29, 1978

[51] Int. Cl.³ ............................................. H04Q 11/04
[52] U.S. Cl. .................................. 370/58; 179/18 E; 370/84
[58] Field of Search ........ 179/15 AT, 15 AQ, 15 BV, 179/18 E; 370/58, 53, 62, 84

[56] References Cited

U.S. PATENT DOCUMENTS

| | | | |
|---|---|---|---|
| 3,585,306 | 6/1971 | Battocletti et al. | 179/15 AT |
| 3,889,067 | 6/1975 | Reed et al. | 179/15 AT |
| 3,922,497 | 11/1975 | Artom et al. | 179/15 AT |
| 3,979,733 | 9/1976 | Fraser | 179/15 AQ |
| 4,136,263 | 1/1979 | Williams | 179/15 AT |
| 4,143,242 | 3/1979 | Horiki | 179/15 AT |

Primary Examiner—Douglas W. Olms
Attorney, Agent, or Firm—Leydig, Voit, Osann, Mayer & Holt, Ltd.

[57] ABSTRACT

A common control telecommunications switching system capable of efficiently handling both narrow band and wide band information. The system uses a hybrid digital network having a time division section for switching narrow band signals and a space division section for switching wide band signals. Both networks include connection memories accessible by the central processor for writing connections therein to set up or take down communication paths between selected access ports.

19 Claims, 6 Drawing Figures

PCM SWITCHING SYSTEM FOR WIDE AND NARROW BAND SIGNALS

This invention relates to telephony, and more particularly to a common control switching system capable of switching both wide band and narrow band information.

Both the concepts of stored program common control and of digital switching are becoming very popular in the current generation of telephone switching systems. Semiconductor technology is making digital networks, that is, networks capable of switching digital rather than analog signals, quite attractive. Digital networks are generally much smaller than their analog counterparts, typically more cost effective, and usually much more flexible.

Common control, and more particularly stored program common control, has been responsible in large part for the cost effective introduction and availability of numerous switching system features. Using the common control approach, features can generally be implemented or modified by simple alterations of the operating program, without the need for extensive hardware changes. Among the attributes of current common control digital switching systems using time division multiplexed (TDM) networks is the characteristic that the central processor needs to spend little of its time in actual control and supervision of the network. Typically the control needs access to the network only when it desires to set up, take down or modify a connection. To accomplish that, the control simply outputs appropriate connection commands to the network indicating the action to be taken, following which the network makes the requested connection and maintains that connection without intervention by the central processor until the central processor again decides the connection should be changed. This frees the processor to spend large portions of its time performing other functions such as maintenance or administration, or searching for additional work.

Another useful attribute of current digital TDM networks is their four wire characteristic, that is the ability to individually switch, transmit and receive in each channel. That feature allows flexibility in setting up connections, for example, multiple connections where one party transmits to a number of receivers, half connections where communication between two parties is allowed only in one direction, and various combinations of the above such as imposing a tone on only one half of an existing connection.

In order to utilize the switching systems outlined above in the conventional telephone environment, it is necessary to process the normal analog telephone signals, by sampling and quantizing, to produce digital words for switching. After switching in digital format, the digital words are converted to analog, filtered and returned as analog signals to the receiving party. This code conversion process has long been used in T1 transmission systems and hence is not overly difficult to implement. It does, however, impose a limit on the maximum frequency which can be accommodated by the system. The typical bandwidth encountered in T1 transmission is about 300 to 3400 Hz. The sampling rate used is 8 kHz which is sufficient to accurately reproduce signals up to about 4 kHz.

It is apparent from the foregoing that if the signal bandwidth increases appreciably, the application of digital switching becomes more difficult. For example, if the maximum frequency increases to about 32 kHz, it is necessary to sample at about 64 kHz. Assuming an 8 bit code, the bandwidth requirements of the system become about 512 kbits per channel. Time division multiplexing of any reasonable number of channels on a T1 type carrier format would become extremely difficult. As a result, in wide band applications, it is most typical to utilize the old electromechanical crosspoints in the network.

In certain situations the requirement exists to common control switch both wide band and narrow band information through one common control. If the conventional electromechanical crosspoint approach is adopted for the wide band signals, then it would appear that two options are available for configuring the system. A first option would be to configure the entire network using electromechanical crosspoints. Alternatively, if it is desired to take advantage of the space and cost advantages achieved by a digital network, it would appear to be possible to build a digital TDM network for the narrow band signals and an electromechanical crosspoint network for the wide band signals. However, because those networks respond so differently controlwise, it would appear to require almost two separate controllers, in effect, providing separate switching systems for the wide band and the narrow band signals.

With the foregoing in mind, it is an aim of the present invention to provide a digital switching system for both wide band and narrow band signals utilizing a stored program common control and a hybrid digital network responsive to the control and compatible with respective bandwidths of the signals to be switched.

More specifically, it is an object of the present invention to provide a switching system using a digital TDM network for narrow band signals, and a digital space division network for wide band signals, both networks responding to connection commands from a stored program common control for setting up connections between assigned ports.

A further object of the present invention is to provide a stored program common control digital switching system having a hybrid digital network, the respective portions thereof being adapted to switch signals in two frequency bands, the maximum frequency in one of the bands being substantially higher than that of the other.

Other objects and advantages will become apparent from the following detailed description when taken in conjunction with the drawings in which:

While the invention will be described in connection with a preferred embodiment, there is no intent to limit it to that embodiment. On the contrary, the intent is to cover all alternatives, modifications, and equivalents included within the spirit and scope of the invention as defined by the appended claims.

Figure 1:
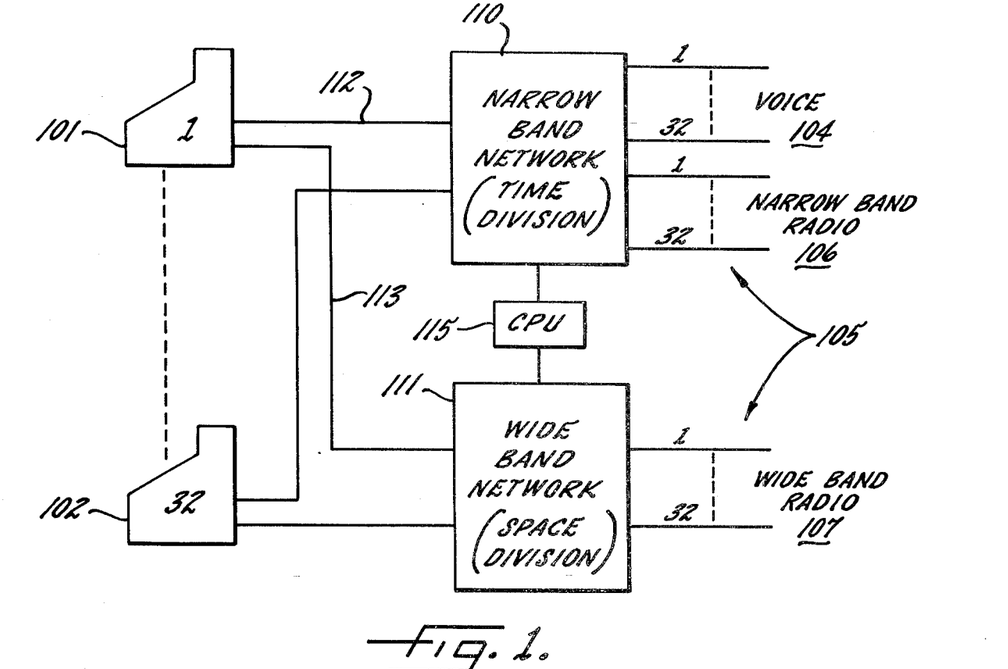
FIG. 1 is a simplified block diagram showing a switching system with hybrid network illustrative of the present invention.

Turning now to the drawings, FIG. 1 shows a switching system having a hybrid digital network illustrative of the present invention. By way of environment, the present invention will be described in connection with an air traffic control system, realizing that this particular application is merely exemplary of other varied applications of the present switching system. An air traffic control system provides a plurality of consoles 101, 102 located at key points on the air base, such as the control tower, air field operations, and the like. By way of the switching system, operators at the consoles can access and control the various communication facilities of the air field. Those communication facilities include various forms of telephone lines, represented by the 32 voice channels 104 as well as a plurality of radio channels 105 for communication with other ground stations and aircraft. In the present embodiment two forms of radio communication are provided. The narrow radio channels 106 carry normal audio signals between the switching system and radio transmitters and receivers. The wide band radio channels 107 carry cipher information, that is audio information specially processed such that it can only be received by compatible equipment. In the case of the telephone channels 104 and the narrow band radio channels 106, the communication bandwidth is restricted to the range from about 300 to 3400 Hz. The wide band radio information 107, however, has a much wider bandwidth, ranging from about 10 Hz. to about 32 kHz.

In accordance with the invention, in order to efficiently switch both of the aforementioned types of signals, a hybrid digital network is provided including a time division network section 110 for the narrow band signals and a space division network section 111 for the wide band signals. Each console can be connected to both networks, for example, console 101 has a first communication link 112 carrying signals between the console and the narrow band network 110, and a second communication link 113 carrying signals between the console and the wide band network 111. As a result, that console can communicate with any of the telephone lines 104, narrow band radio channels 106 or wide band radio channels 107 when appropriate connections are established in the proper network. Both networks are under the control of a single central processor 115 which is programmed to control the functions of the switching system including responding to requests for service and setting up connections in the respective networks for establishing the necessary communication paths.

Figure 2:
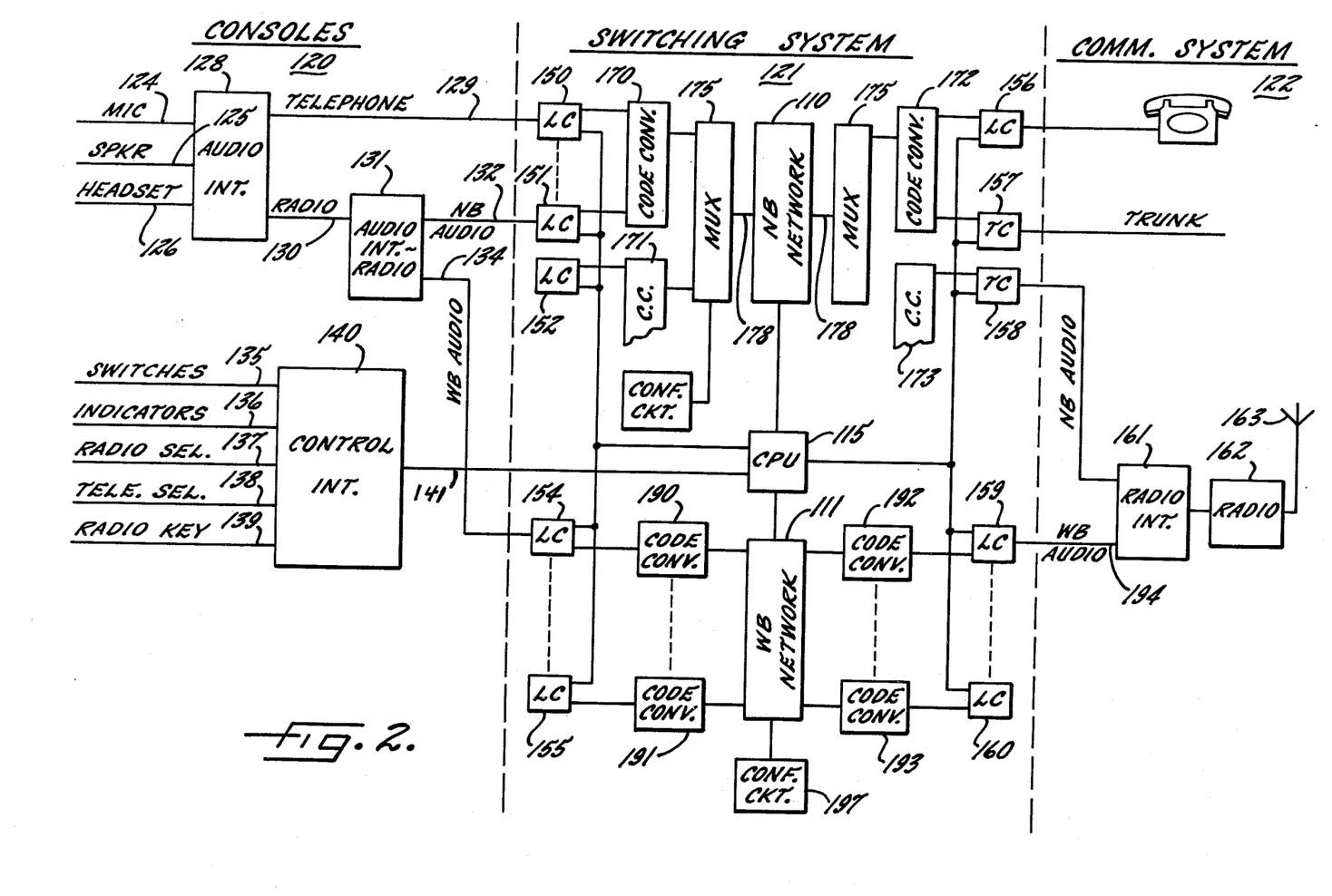
FIG. 2 is a more detailed block diagram of the system of FIG. 1.

Turning now to FIG. 2, there is shown a portion of the switching system of FIG. 1, subdivided into three sections, namely, consoles 120, switching system 121 and communication system 122. The console portion 120 shows the elements associated with a single console, which are duplicated in whole or in part for additional consoles. Turning first to the audio portion, there is shown provision for a microphone 124, a speaker 125 and a headset 126 which typically includes both earphones and a microphone. The signals for those elements are coupled to an audio interface 128 which selectively interconnects the operator accessible elements 124-126 with the appropriate communication lines routed to the switching system 121. For example, when the operator selects one of the communication system telephone lines, the audio interface 128 connects the headset 126 (or the microphone and speaker 124, 125) to line 129 which carries telephone signals between the console and the switching system. Alternatively, when the operator selects one or more radio channels, the audio interface 128 routes the signals to a radio communication path 130. When the console is equipped with cipher capability the line 130 is connected to an audio interface 131 for radio signals where the audio is switched directly through to a narrow band audio channel 132 if ordinary communication is selected or processed as cipher information and switched to a wide band audio path 134. The lines 132, 134 are routed to the switching system 121 to allow audio communication between selected radio elements and the operator.

It should be noted at this point that the manner in which the narrow band and wide band signals are produced is not important to an understanding of the present invention. More specifically, the invention relates to the manner of switching and interconnecting narrow band channels and wide band channels irrespective of how the particular signals are produced.

Controlwise, the console includes a plurality of switches and indicators 135, 136 for allowing the operator to command the system to perform certain functions, and for indicating to the operator the status of the system. Among the controls are radio selectors 137, typically comprising an array of pushbuttons for selecting the radio channels available to the console in question, and a similar array of telephone selector switches 138. Additionally, a radio key control 139 is provided for keying selected transmitters. The control lines are all coupled to a control interface 140 which communicates via a data link 141 with the central processor unit 115 in the switching system 121. The data link 141 allows the processor to treat the control interface 140 as an array of sense and control points, such that the processor can detect actuation of any of the switches or selectors and also control indicators or signaling devices.

The central processor 115, in addition to exchanging control signals with the control interface 140 also has control circuit connections to a plurality of line circuits and trunk circuits serving the various audio ports. For example, line circuits 150-152 are provided for servicing the narrow band audio ports from the consoles, including the lines 129 providing telephone signals and the lines 132 providing narrow band audio for radio transmission. Additionally, wide band line circuits 154, 155 are provided for servicing wide band signals from the consoles. On the other side of the network line circuits, represented by line circuit 156, are provided for servicing telephone instruments; trunk circuits, represented by trunk circuit 157, are provided for servicing trunks which may be connected, for example, to a major public type switching center; trunk circuits 158 are provided for servicing narrow band audio for radio transmission; and wide band line circuits, represented by line circuits 159, 160, are provided for servicing wide band audio for radio transmission. A radio interface 161 selects the wide band or narrow band audio and couples it as a modulating signal to a radio 162 for transmission via antenna 163. In the opposite direction, the interface 161 receives a demodulated audio signal (narrow band or wide band) from the radio 162 for return to the consoles.

The central processor 115, as noted above, has circuit connections to each of the line and trunk circuits. It is capable of scanning sense points in the line and trunk circuits for detecting state changes, requests for service and the like. In addition, the line and trunk circuits provide control points which may be written by the central processor for controlling the signaling state of the line or trunk circuits. As examples of control operation, the CPU may write a control point in a line circuit for causing ringing of the telephone connected to the line, may write a control point in a trunk circuit for causing signalling on the trunk, may write a control point in a trunk circuit connected to the radio interface for the purpose of keying the associated radio, and the like.

As shown in FIG. 2 the central processor 115 also has control circuit connections to the narrow band network 110 and to the wide band network 111. Those connections allow the central processor to couple connection commands to the respective networks for the purpose of making connections in the networks. As used herein, the term "making connections" is intended to include the concepts of establishing a communication path, taking down a communication path and modifying a communication path. The manner in which those paths are established will be described in detail below. It is noted at this point, however, that once the CPU sends a connection command to the network, the connection itself is maintained by the network without further intervention by the central processor.

Returning now to the audio portion of the switching system, the line circuits and trunk circuits function to interface the audio from the consoles 120 or the communication system 122 with the switching system 121. Typically the line circuits include a hybrid for interfacing signals on a two wire line with the four wire switching system. The trunks circuits may or may not contain a hybrid depending on whether the trunk in question is a two wire or four wire trunk.

Focusing first on the narrow band line circuits and trunk circuits 150-152, 156-158, it is noted that all of such circuits provide bidirectional communication between the switching system and the attached equipment. Signals directed into the switching system are first filtered, then coupled to a receive gate which is closed momentarily to take a sample of the incoming signal at an 8 kHz rate. The line and trunk circuits are grouped in blocks of 24 and the receive gates operated in time sequence to provide a sequence of 24 PAM samples, such sequence being presented to associated code converters 170-173. The code converters digitize the PAM samples in sequence and output them to associated multiplexers 175. The multiplexers in turn arrange all of the signals in time sequenced fashion such that they are presented to the narrow band network 110, with each audio port occupying a dedicated time slot on a network highway 178.

FIG. 2 illustrates a pair of multiplexers and a pair of network highways, for convenience, to show that the consoles on the left of the figure communicate with the equipment on the right. In the actual implementation, however, the multiplexers will be a single unit and only a single incoming highway will be provided with all of the channels allocated respective time slots in the highway. In such a time division multiplexed switching system it is possible to interconnect any channel with any other. However, in the particular application in question, there is no requirement for interconnecting, for example, narrow band radio channels with each other. The main function of the system is to allow consoles access to the communication system and accordingly FIG. 2 is intended to emphasize the point. However, because the network is nonblocking and fully available, it is, of course, possible to interconnect consoles for communication with each other via the network 110.

As will be described below, the information from the highways 178 is a serial sequence of parallel PCM words which are written into dedicated slots in the information memory of the narrow band network 110. The narrow band network accomplishes switching by reading out previously stored information under the control of a connection memory during the time slot associated with each incoming channel. For example, when the PCM word for channel 5 is being received and stored, if channel 5 is connected to channel 8, during the channel 5 time slot information from channel 8 will be read out and imposed on the outgoing highway. Thus, the network highway 178, rather than being bidirectional as suggested is actually a pair of oppositely directed unidirectional highways. Similarly, the connections between the multiplexer 175 and the code converters as well as the connections between the code converters and the line circuits are also paired unidirectional circuit connections.

Switched digital words output from the network are conveyed on the highway 178 to the multiplexer 175 where they are demultiplexed and distributed to the code converters 170-173. The code converters perform a decoding function to convert the digital words sequentially imposed to PAM samples. The PAM samples are passed to the associated line and trunk circuits 150-152 and 156-158 where they are filtered and output on the analog lines to the consoles and/or communication system.

As a further feature of the narrow band network a conference circuit 180 can be provided to allow even greater flexibility in interconnecting a plurality of parties. The conference circuit may be of the digital variety operating to compare digital samples of all conferences and output the largest to all parties in the conferences except the speaker.

Turning now to the wide band portion of the system, it was noted above that line circuits 154, 155 were provided for interfacing wide band audio between the consoles and the network and that other line circuits 159, 160 were provided for interfacing wide band audio between the radio interfaces 161 and the network. Typically the wide band audio will be carried on four wire circuits rather than two wire, so no hybrid circuits, as used in the narrow band line circuits, are necessary. The wide band line circuits do, however, include low pass filters for eliminating frequencies beyond the bandwidth in question and also sampling switches similar to those in the narrow band line circuits. In the exemplary embodiment the wide band audio ranges to about 32 kHz, requiring that the filters in the wide band line circuits attenuate frequencies above that band, and that the sampling switches operate at about 64 kHz or more. In contrast to the narrow band network where a plurality of line circuits shared a code converter and were sampled in sequence, in the wide band network each line circuit is provided its own code converter. For example, line circuit 154 is connected to code converter 190, while code converters 191-193 are similarly connected to associated line circuits. Each wide band line circuit converts its associated wide band audio signal to a succession of PAM samples, all originating from the same audio signal, the samples being taken at a 64 kHz rate. The associated code converter digitizes the PAM samples and outputs digital words representative of the sampled analog signal. It is convenient, although not necessary, that the code converters utilize the D2/D3 PCM code utilized by the narrow band code converters. In the case where the code converter produces a serial output, that output is connected directly to the wide band network 111. If, however, the code converter used is of the type which produces output words in parallel, then the output portion of the code converter will include a parallel to serial converter.

The wide band network 111 serves to selectively interconnect serial bit streams from the code converters on the left and the right of the network. For example, a connection may be set up between the channel associated with code converter 191 and that associated with code converter 192 by writing appropriate words into the wide band network connection memory. With that accomplished, a path will be set up to pass the serial bit stream produced by code converter 191 to the code converter 192 where the serial digital words are again converted to analog PAM samples. Those PAM samples are passed to the associated line circuit 159 for filtering whereupon they are output on the wide band audio line 194 as switched reconverted wide band audio.

Similarly, audio information received by a radio such as 162 is passed through the radio interface 161 and presented to the associated line circuit 159. Such audio is converted to PAM samples and presented to the code converter 192 for digitization whereupon it is switched through the wide band network 111 to a selected code converter on the left side thereof for reconversion to PAM, filtering, and output as switched reconverted audio. As in the case of the narrow band network, the wide band network can have an associated conference circuit 197 to allow greater flexibility in making multiple connections.

Before directing attention to further structural details of the system, there will first be described, in general terms, some of the many types of connections which can be set up in the switching system. First of all, each console can have three separate audio communication paths, a telephone circuit 129, a narrow band audio circuit 132 and a wide band audio circuit 134. Since the central processor 115 can control both networks 110, 111 in substantially the same manner, only one control channel 141 is needed. Using that control channel, an operator at the console can command the switching system to establish connections with any parts of the communication system to which it is allowed access. It is possible, of course, to program the central processor 115 to restrict access to certain portions of the communication system from any console.

Since each console can have three audio paths, it will be appreciated that each console will be allocated three audio ports in the hybrid network, two in the narrow band network (for telephone and narrow band voice) and one in the wide band network. By operating the appropriate selectors at the console, an operator can simultaneously maintain connections on all three paths. In addition to that, if an operator desires to transmit on a plurality of say narrow band radios, he can select all of the radios desired and simultaneously transmit. This is accomplished in the narrow band network by setting up one way connections between the incoming audio from the console and the outgoing audio of each of the selected radios. The wide band network has the same capability. If, however, an operator desires to monitor radio reception from a plurality of radios, since he has only one narrow band or one wide band audio channel, it is necessary to bring the respective conference circuits into play to combine the received audio for transmission on the console's audio path. A plurality of consoles may also select a single radio receiver for monitoring the incoming signal. This is accomplished in either the wide band or the narrow band network by setting up one way connections between the incoming audio from the selected receiver to the outgoing audio of all of the consoles selecting that receiver. Generally it is not necessary to allow a plurality of consoles to select a single transmitter, since the audio path is completed only upon depression of a push-to-talk switch at the console. The central processor is adapted to monitor its control channels for actuation of any of the push-to-talk switches, and can either award the transmitter to the first console to key it, or have a built-in priority scheme for resolving conflicts.

It will be apparent that the stored program common control, where assignments, priorities and the like can easily be changed by simple program manipulation, and the four wire independently controlled hybrid network provide virtually unlimited flexibility in interconnecting the elements of the illustrated switching system.

Figure 3:
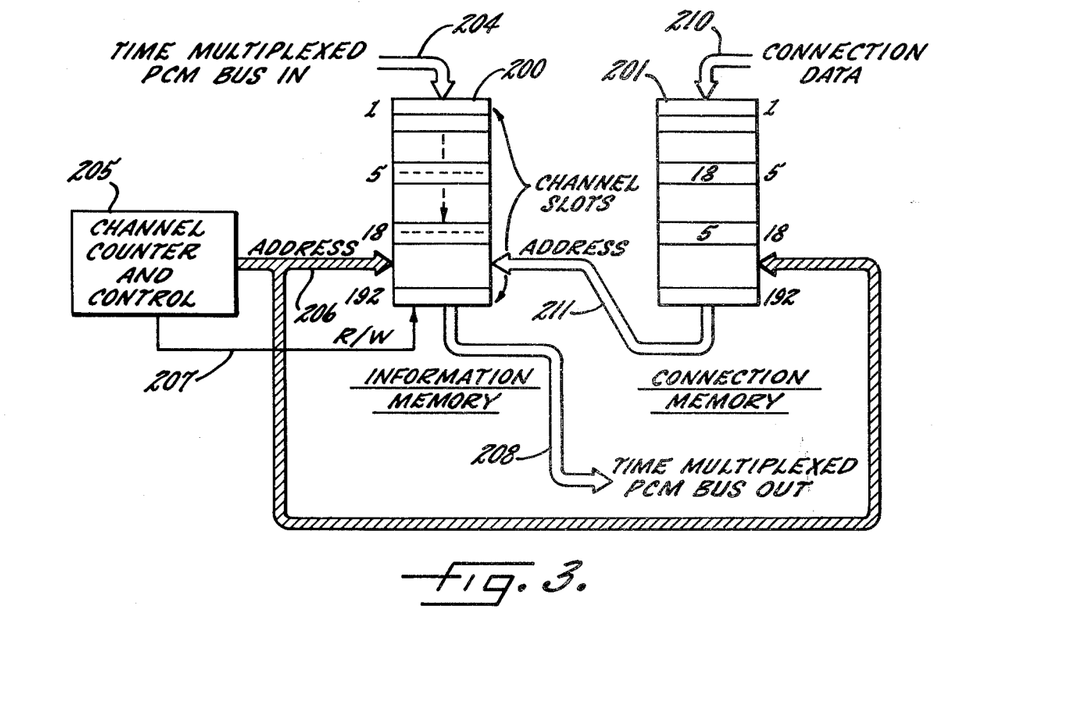
FIG. 3 is a schematic representation of the narrow band network of FIG. 2.
Figure 4:
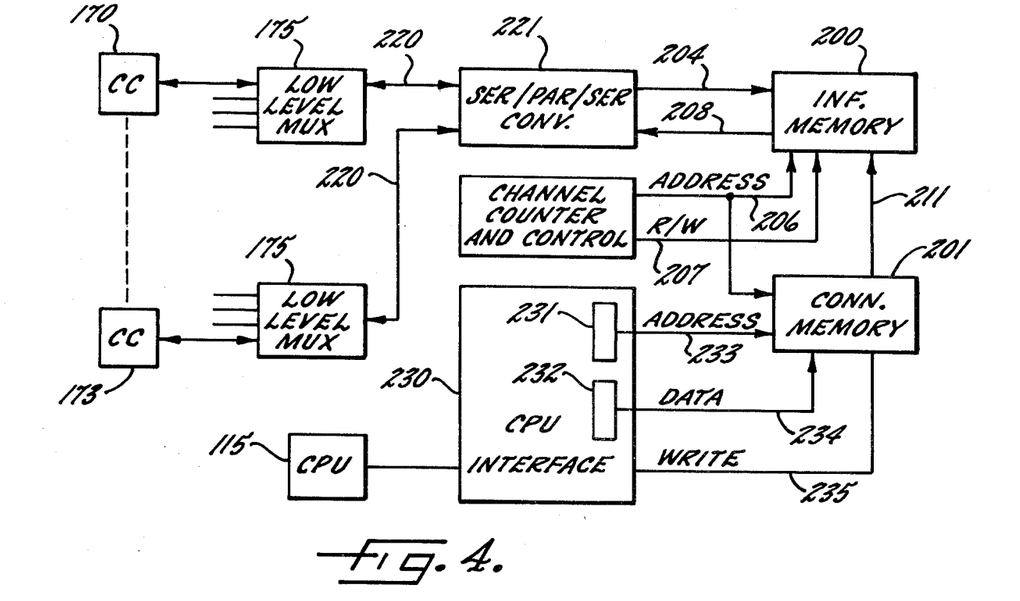
FIG. 4 is a more detailed block diagram of the narrow band network.

Further details of the narrow band network will now be provided with reference to FIGS. 3 and 4. FIG. 3 schematically represents the major functional elements of the time division multiplexed narrow band network 110. The network has a pair of semiconductor random access memories including information memory 200 and connection memory 201. Each memory is sectioned into a plurality of separately addressable multi-bit words, with a word provided for each of the network time slots. The system illustrated in FIG. 3 is a relatively small network having 192 time slots and therefore capable of accommodating 192 ports. Incoming information from the PCM highway 178 of FIG. 2 is presented as a sequence of parallel digital words on a time multiplexed PCM input bus 204 connected to the data input lines of the information memory 200. A channel counter and control subsystem 205 has address outputs 206 coupled to the address lines of the memory 200 and a read/write output 207 coupled to the read/write control line of the memory 200. The channel counter and control 205 is operated in synchronism with incoming PCM information to write received data words from each of the audio ports into the channel slots allocated to those ports. For example, when a sample from channel 1 is present on the input bus 204, the channel counter will cause the first word of the memory 200 to be addressed and will actuate the write line to cause the data present on the bus to be written into that word of memory. Channel 2 follows in sequence whereupon the channel counter addresses word 2 to write the data and so on. Following writing of the 192nd word, the channel counter re-sequences to address word 1 to continuously update the information samples in the memory 200. Using the timing noted previously each sample is updated every 125 microseconds. The information memory 200 also has a time multiplexed PCM output bus 208 which, as will now be described, carries switched information for return to the audio ports. The bus 208 returns switched samples to the outgoing portion of the network highway 178 (see FIG. 2).

For making connections in the network, the central processor 115 has access to the connection memory 201 via a connection data bus 210. Using this bus, the processor can write connection data into the memory 201 which is later read out and coupled to the information memory 200 via a bus 211 for addressing selecting words in that memory. Furthermore, the address bus 206 from the channel counter and control module 205 is also coupled to the connection memory 201 for sequentially addressing the words therein. In operation, each time slot is divided into two portions wherein incoming PCM information is written into the information memory during a first portion under the control of the channel counter, and in the second portion, information is read out of the information memory 200 at an address determined by the connection memory 201.

Accordingly, when the central processor desires to set up a connection, say between channels 5 and 18, it utilizes the connection data bus to write the address of channel 18 into the fifth time slot of the connection memory 201 and to write the address of channel 5 into the 18th time slot as illustrated in FIG. 3. As samples continue to flow down the PCM highway they are sequentially written into their associated locations in the information memory 200. When the fifth time slot occurs, during the first portion thereof, the PCM information from channel 5 is written into the word associated with channel 5 in the information memory under the control of the channel counter and control 205. Since the channel counter is also addressing the fifth word in the connection memory 201, the address of channel 18 is available on the output lines of the connection memory and used to address the information memory during the second half of the fifth time slot. The channel control module 205 will then activate the read line of the connection memory, causing information previously stored in the channel 18 time slot to be read out on the time multiplexed output bus.

Similarly, when the channel counter advances to the channel 18 time slot, during the first half of the time slot incoming information from channel 18 will be written into the 18th information memory location. During the second half of the time slot, the address of the fifth channel will be read from the connection memory and used to address the fifth location in the information memory for reading out of the information previously stored. It will be appreciated that any combination of channels can be connected for exchange of information between time slots, a single two party connection being selected as a simple illustration.

It is also noted that in the system of FIG. 2 each console has a pair of ports on the narrow band network and thus has two assigned channel slots in the memories 200, 201. Thus, separate connections can be set up in the network for both the telephone and narrow band audio signals. In addition, one way communication can be set up between an incoming time slot and a plurality of outgoing time slots. Assume, for example, that channel 18 is allocated to a console and that channels 1, 5 and 192 are allocated to three separate radio transmitters. In order to connect the console assigned time slot 18 with all of those radio transmitters, it is simply necessary for the central processor, in addition to writing the address of channel 18 into the fifth time slot of the connection memory as described above, to also write that address into the first and 192nd time slots. Thus, during the second portion of each of the first, fifth and 192nd time slots, channel 18 of the information memory will be addressed to write the sample previously received from the console into the time slot on the outgoing PCM highway of each of the transmitters. If, while transmitting on all three of those radios, the operator of the console assigned to channel 18 desires to monitor reception from still another radio, it is simply necessary for the central processor to write the address of the desired radio into the 18th time slot of the connection memory 201. As noted above, the system provides great flexibility in establishing connections between its various elements.

Time division multiplexed networks are not new, having been described, for example, in co-pending application Ser. No. 833,954, now U.S. Pat. No. 4,146,749 assigned to the same assignee as the present invention, from which additional detail may be gained. The following will summarize the structural relationship between the elements of that time division multiplexed network, with reference to FIG. 4, which corresponds generally to FIG. 3 of the aforementioned application.

Only the digital portion of the network 110 is illustrated in FIG. 4, it being understood that the line circuits, trunk circuits and the like illustrated in FIG. 2 are connected as inputs to the code converters 170-173 shown at the left of FIG. 4. Furthermore, it is noted that the code converters illustrated in FIG. 4 represent both those serving the consoles 120 and the communication system 122. As is also appreciated by the art, some of the network ports can be dedicated to other functions such as tones, register-senders, and the like. It will be evident to those skilled in this art that one or more of the code converters can simply be replaced by circuitry to perform whichever of such functions are deemed desirable.

As noted above, all of the digital signals from the code converters (as well as all of the digital signals returned to the code converters) are multiplexed/demultiplexed to form an incoming PCM highway 204 and an outgoing PCM highway 208. The initial stage of the multiplexing/demultiplexing takes place in low level multiplexers 175, two of which are illustrated in FIG. 4. Each of such low level multiplexers handles 96 channels, the equivalent of four code converters. Considering first signals coming into the network, PCM words received from the assigned code converters are interleaved by each multiplexer 175 to form respective 96 channel serial PCM buses 220. The buses 220 are connected to a serial to parallel to serial converter 221 which converts the serial bit streams to parallel and interleaves the parallel PCM words to form the incoming highway 204 which is coupled to the information memory 200. It is on this highway that each channel occupies a dedicated time slot, with each time slot containing information received from the associated channel. Switching occurs in the information memory 200 as described with reference to FIG. 3 and this switched information appears on outgoing highway 208. On this highway each channel also has a dedicated time slot, but the slots contain information switched through the network destined for the associated channels. The serial to parallel to serial converter receives this parallel information, converts it to serial and returns it on the outgoing section of the buses 220 to the respective low level multiplexers. The low level multiplexers demultiplex the information for distribution to the associated code converters, which convert the digital information to PAM samples which are ultimately filtered and returned to the appropriate analog communication channel.

Also as described with reference to FIG. 3, the channel counter 205 and connection memory 201 interact with the information memory 200 to cause switching of data in time to establish connections in the network. The channel counter 205 sequentially addresses the words in both the information memory and the connection memory. As noted above, during the first half of a time slot received PCM information on the bus 204 is written into the addressed slot in the information memory. During the second half of the time slot, the connection data stored in the addressed word of the connection memory 201 is used to address the information memory for read out of information previously stored.

The common control central processor unit 115 has control access over the connection memory via a CPU interface 230. The CPU interface has the necessary logic for decoding an assigned address such that the CPU may selectively address the interface. Such logic can be implemented, for example, by a commercially available digital comparator. In addition, the CPU interface 230 contains a pair of addressable buffer registers 231, 232 used to set up connections in the network. When the CPU desires to write a connection, it outputs an address on its address lines dedicated to the CPU interface 230 and also carrying the address of one or the other of the buffers 231, 232. At the time the buffer 231 is addressed, the CPU 115 also outputs on its data lines the address of the location in the connection memory 201 where it desires to write a connection. At the time the buffer 232 is addressed, the CPU outputs on its data lines the address of the port to which the connection is desired. The buffers 231, 232 are connected to the connection memory via buses 232, 234 respectively along with a write control line 235. After the buffers 231, 232 are loaded with a connection command, the buffer 231 via the address bus 233 addresses one of the locations in the connection memory 201, while the buffer 232 via the data bus 234 provides connection data on the data lines of the connection memory 201. At the appropriate time in the network cycle, the write line 235 is activated to write the connection data on the data lines into the addressed location to set up a one way connection. If the CPU desires to set up a two way connection, or multiple connections, it again addresses the CPU interface to load further connection commands into the buffers 231, 232.

Time division multiplexed networks are now becoming well known but, as noted above, are generally limited to the voice frequency band, up to about 4 kHz, unless special sampling techniques are used to sample the higher frequency signals at a higher rate. But when that occurs, the number of time slots decreases, making the time switch much less attractive. Due at least in part to the capabilities and flexibility of the common control and digital switching, the time division switch provides an attractive solution to the voice switching problem.

In accordance with the invention, such a time division switch is utilized in a hybrid network along with a digital space division switch, both switches responding to similar controls from a single central processor unit, so that the system is able to accommodate both narrow band and wide band information. As a result, the capabilities and flexibility of the common control and digital switching are realized while still providing the ability to switch wide band data.

Figure 5:
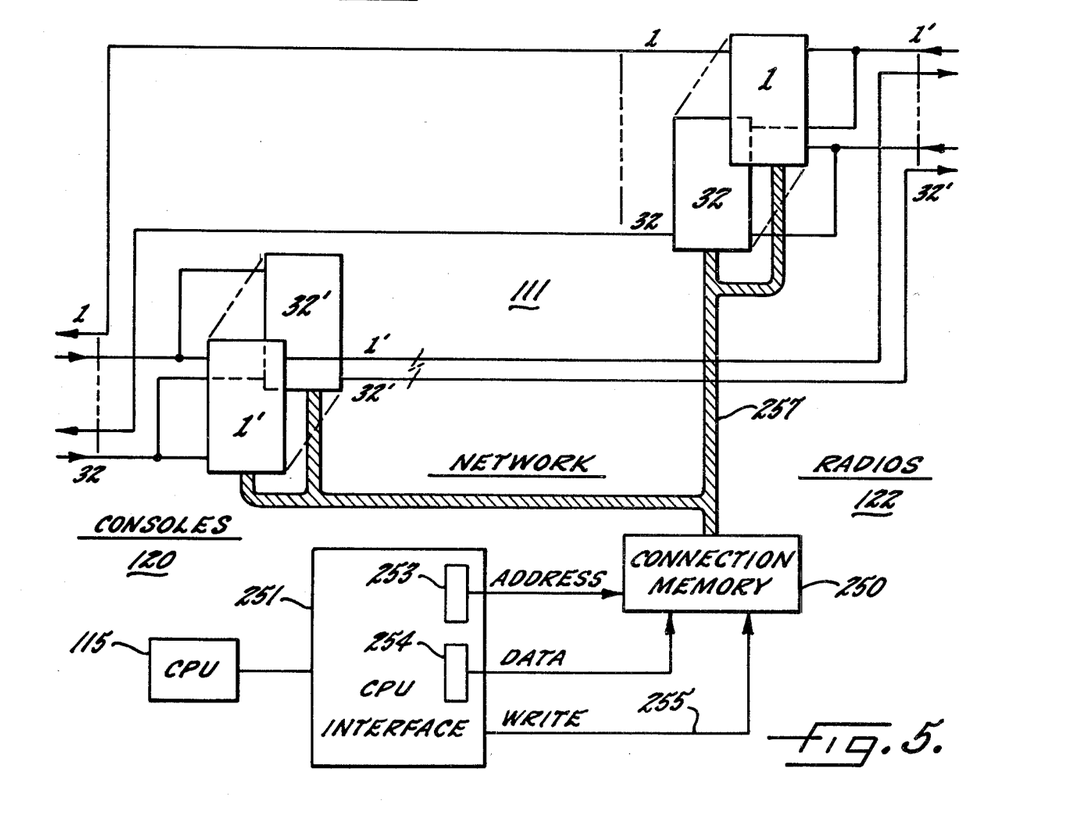
FIG. 5 is a schematic representation of the wide band network of FIG. 2.

Referring now to FIG. 5, there is shown in diagrammatic form the wide band network 111 configured as a digital space division switch. The consoles 120, their associated line circuits, code converters and the like are situated to the left of the figure and provide a plurality of paired oppositely directed unidirectional buses 1–32 carrying signals to and from the associated consoles. As noted in the description of FIG. 2, the wide band audio is passed through an associated line circuit and a dedicated code converter to produce a serial bit stream directed toward the network and carrying a sequence of PCM words representing samples of the signal on the audio path. Similarly, digital information switched through the network is converted to analog in the code converters, filtered in the line circuits for return on the audio paths. The buses 1–32 represent, when directed toward the network incoming serial PCM words from the 32 consoles, and when directed toward the consoles, outgoing serial PCM words to the code converters for return to the consoles. Similarly, the radio channels 122 are located to the right of FIG. 5, fed by a plurality of outgoing PCM serial buses and feeding a plurality of incoming serial PCM buses 1'–32' via line circuits and code converters.

The wide band space division network 111 includes a plurality of multiplexer units 1–32 and 1'–32' serving the channels of the corresponding number. For the 32 by 32 configuration illustrated in FIG. 5, each of the multiplexer units has 32 inputs and a single output. Looking first to the multiplexer units whose outputs serve the radio channels, that is units 1'–32', it is seen that each of the units has all 32 of the console incoming buses connected thereto. Each of the units has but a single output, such that unit 1' has a 1' output for serving channel 1', and so on.

Similarly, the multiplexer units serving the consoles are 32 in number, and have all 32 of the incoming PCM serial buses (1'–32') from the radios coupled thereto. Each of the multiplexer units has a single output for serving its associated channel. For example, unit 32, which has all of incoming channels 1'–32' connected thereto as inputs, has a single output identified as 32 which is the outgoing PCM serial bus for channel 32.

In practicing the invention the state of the multiplexer units is controlled by the central processor unit 115 via a connection memory 250. Just as in the case of the narrow band network, the connection memory 250 is adapted to maintain a connection once established, without further intervention by the CPU, unitl the CPU again decides to take it down. A CPU interface 251 is provided for coupling connection commands issued by the central processor 115 to the connection memory 250. As was the case with the narrow band CPU interface, the wide band CPU interface 251 also has a pair of buffer registers 253, 254. The register 253 is written by the CPU with the address of a word in the connection memory 250 where a connection is to be written. The data register 254 is written with the address of the second party to the connection. As in the case of the narrow band network, after the connecting command is sent to the interface, a write command is generated on a control line 255 which causes the transfer of the information to the connection memory for establishing the a one way connection. If the CPU desires to make the connection two way, or to add additional branches to the one way connection, it writes further addresses and data words into the buffers for establishing the additional connections.

As schematically illustrated in FIG. 5 the connection memory has a control bus 257 connected to each of the multiplexer units so that the connection memory can control connections between all of the channels.

Figure 6:
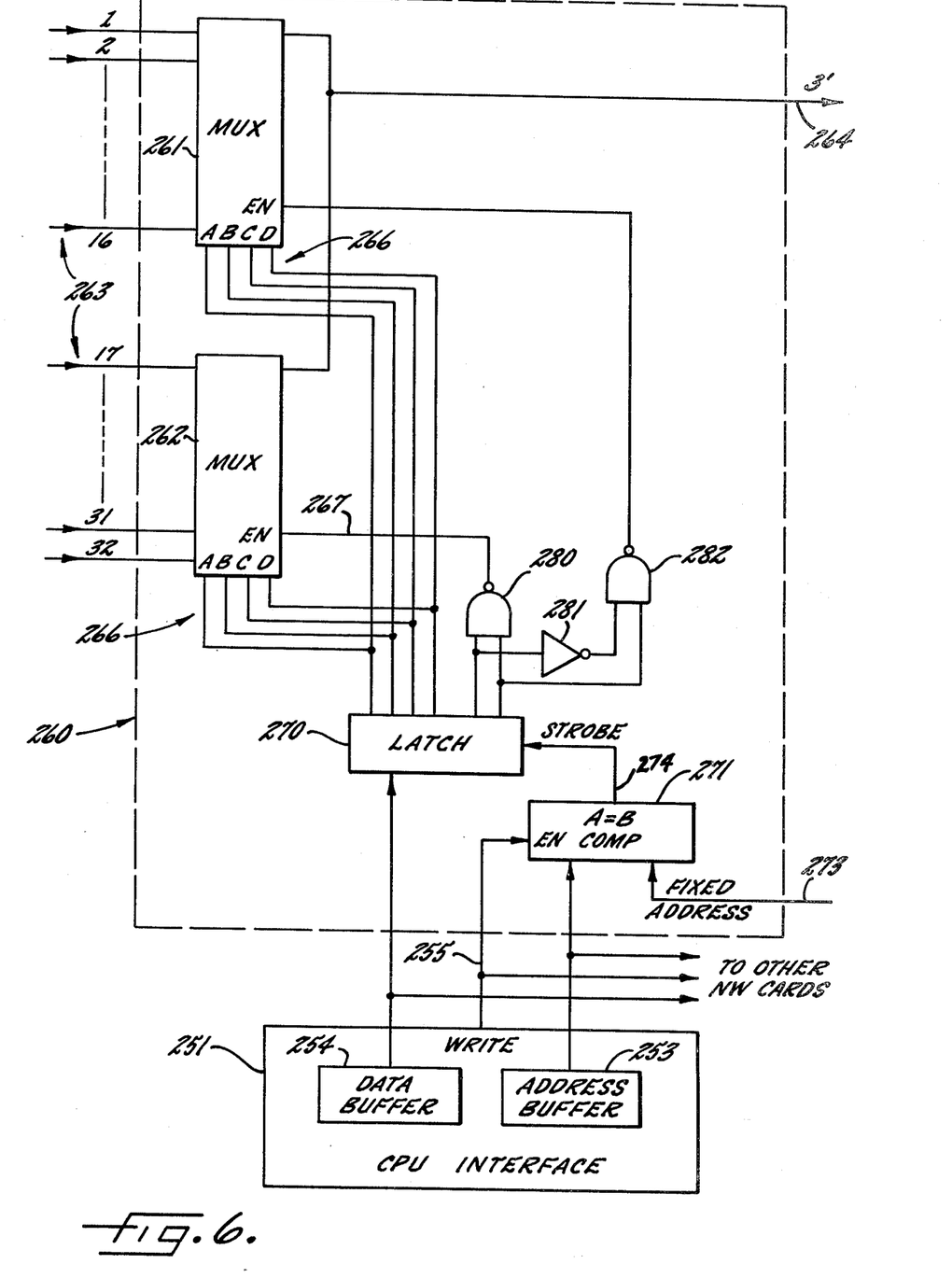
FIG. 6 is a more detailed schematic diagram of a portion of the wide band network.

Turning now to FIG. 6, there is shown one of the multiplexer units forming a portion of the wide band network and also a portion of the CPU interface 251. The illustrated multiplexer unit 260 is taken as the 3' board, having the PCM serial buses 1-32 from all of the consoles coupled thereto as inputs 263, and having a single output 264 serving radio channel 3'. In the illustrated embodiment, a pair of 16 to 1 commercially available multiplexer circuits 261, 262 are provided for handling the 32 input channels. Serial data from each of the console channels is present at the respective multiplexer inputs, and any one of such channels can be selected for passage to the output 264 by appropriately addressing the multiplexer. Realizing that there are 32 of such multiplexer units, one for each of the 32 radio channels, it will be appreciated that any console can be connected to any radio. Similarly, since there are 32 additional multiplexer units, each having an output associated with one of the console channels 1-32, and each having parallel inputs from all of the radio channels (1'-32'), it is possible to connect any radio input signal to any or all of the consoles.

For causing the multiplexer circuits 261, 262 to couple a particular one of the input serial bit streams to the output, four address lines 266 are coupled thereto as well as an enable line 267. The binary signals on the four address lines select one of the sixteen inputs for each multiplexer chip while the enable input selects one or the other of the chips, or none of the chips when the associated channel is not connected to receive information. For example, coupling the binary representation of nine onto the address lines 266 along with a chip 261 enable signal will cause the channel 9 console input information to be passed to the output 264 for transmission to channel 3' via the multiplexer 261, while the multiplexer 262 remains disabled.

While it is possible to configure the connection memory for the wide band network as an integral unit or as a distributed unit, it is presently preferred to follow the latter course, which course is illustrated in FIG. 6. Accordingly, a dashed outline 250' encloses elements which form the portion of the connection memory associated with radio channel 3'. It will be appreciated that each of the multiplexer units has a similar portion of the connection memory associated therewith, such that the connection memory is distributed among the multiplexer units. With this arrangement it is possible for the central processor to set up a connection which is maintained at all times from the instant it is set up until the instant it is taken down, without the necessity for sequencing or the like. Accordingly, once the connection is made, it remains, and the selected channel of the multiplexers continuously passes PCM data data from the selected channel to the associated output to maintain the connection until it is again modified.

Turning now to the details of the distributed connection memory, it is seen that there is provided a latch circuit 270 and a comparator circuit 271, both having circuit connections to the CPU interface 251. Just as described above, the CPU interface 251 has an address buffer 253 and a data buffer 254. The binary word loaded into the address buffer is coupled to the address comparator 271 in the distributed connection memory for comparison with a fixed address 273 assigned to the particular channel. The fixed address can be assigned either by way of strapping or by back-plane wiring. The latter approach is preferred because it makes the cards universal, inserting a card into a particular slot assigning it a channel identity.

Assuming the CPU desires to write a connection into the multiplexer unit 260 serving radio channel 3', it writes the address of channel 3' into the address buffer 253, and the address of a second party into the data buffer 254. The address in the buffer 253 is compared with the respective fixed addresses in all of the multiplexer units, and produces a match with the fixed address 273 of the unit 260 in the form of a strobe signal on the comparator output 274. In cases where it is desired to use the write control signal 255, that signal can serve as an enabling input for the comparator 271. In some cases, because the wide band network is less sensitive than the narrow band network to the exact time at which a connection is set up, it may be possible to eliminate the write control and simply compare addresses.

When the address in the buffer 253 matches the fixed address of a particular card, the strobe signal produced on line 274 causes the latch 270 to load the data held in the data buffer 254. Recalling that the CPU wrote the data buffer with the address of the party to be connected, it is seen that the binary identity of the party to be connected to channel 3' is latched into the register 270. The four low order bits of the latch 270 drive the address lines 266 of the multiplexer circuits, thereby selecting one of the sixteen inputs for each of the multiplexer circuits 261, 262. The next most significant bit is utilized to enable either the multiplexer circuit 261 or 262 depending on its binary state. When that bit is a binary 1, a NAND gate 280 will be satisfied, enabling the multiplexer circuit 262. Contrarywise, when the bit in question is a binary 0, an inverter 281 will invert the zero to satisfy a NAND gate 282, thereby enabling the multiplexer circuit 261 but disabling the multiplexer circuit 262.

The most significant bit is provided for disabling the entire multiplexer unit, setting that bit at a zero serving to prevent passage of signals through either of NAND gates 280 or 282, thereby preventing the enabling of either of the multiplexer circuits 261, 262. Accordingly, whenever the CPU decides to take down a connection to channel 3', it simply writes a binary word into the latch 270 having a zero in the most significant bit position, thereby preventing the passage of PCM information to the associated channel.

It will be appreciated that once the CPU sets up a connection by loading a data word into the latch 270 in the manner described above, it may then utilize the CPU interface for writing other connections, or if no connections are to be written to perform other work. The connection will be maintained in the portion of the wide band network where it is established without further intervention from the CPU.

It should be noted that in some cases it may be possible to simplify or even eliminate the CPU interfaces associated with the respective networks. Because use of the interfaces and buffers simplifies timing, allowing the CPU to simply write the buffers at any time, irrespective of whether the network is ready to utilize the information, that approach has been described above. However, it may be possible to eliminate the buffers and write connections directly in the network. For example, the CPU may directly address and couple data to the address comparators and latches of the wide band network without the need for intermediate buffers. Accordingly, whether or not buffers are used is not the important consideration. The important consideration is that the hybrid digital network, although having both time division and space division aspects is arranged to respond to similar or identical connection commands from the CPU, and to maintain those connections without further intervention from the CPU. In that way, the features which have now become available in time division multiplexed switching systems can be efficiently and effectively implemented in a switching system capable of serving as much wider bandwidth than has heretofore been possible.

I claim as my invention:

1. A telecommunications switching system comprising in combination, a plurality of wide band ports and a plurality of narrow band ports, a common control for controlling the functions of said system and including central processor means for producing connection commands for making connections between the ports, a hybrid digital network including time division means and space division means, the time division means including an information memory and a related connection memory having a plurality of memory locations associated with the respective narrow band ports for receiving and storing connection commands from the central processor means to effect connections between the narrow band ports, the space division means including space switching means and a related second connection memory having a plurality of memory locations associated with the respective wide band ports for receiving and storing connection commands from the central processor means to effect connections between the wide band ports, and means responsive to the connection commands stored in the respective connection memories for controlling the information memory and space switching means respectively to selectively make connections in the hybrid network.

2. The switching system as set forth in claim 1 including means for interfacing the common control with the respective connection memories, said interface means including address means for addressing a particular location in one of the connection memories and data means for providing the digital address of a connected channel for storage in said addressed location thereby to set up a connection in said network.

3. The switching system as set forth in claim 1 including a plurality of code converters connected to the ports for converting between analog signals at said ports and digital words representative thereof for switching, the code converters associated with the narrow band ports having a first channel sampling rate and those associated with the wide band ports having a second sampling rate, the respective sampling rates being at least about twice the highest frequency in the respective frequency bands.

4. The switching system as set forth in claim 3 wherein the time division means includes means for assigning time slots to the narrow band ports and arranging the digital words associated with said ports in their respective time slots on a network highway, the information memory including means for storing the digital words from the respective time slots in associated memory locations, the connection memory including means for addressing the information memory for readout of samples from connected time slots, thereby to swap samples between connected time slots for effecting connections therebetween.

5. The switching system as set forth in claim 3 wherein the space division means includes a plurality of multiplex means having inputs and outputs connected to the code converters, the second connection memory including means for addressing the multiplex means to pass digital words from a selected input to a selected output, thereby to connect the associated wide band ports.

6. The switching system as set forth in claim 5 wherein the connection memory comprises a plurality of storage means associated with the respective multiplex means for storing the address of a connected party thereby to maintain a connection between a selected input and the output of the multiplex means.

7. A telecommunications switching system for both wide band and narrow band information comprising in combination, a plurality of narrow band ports for sending and receiving narrow band information, a plurality of wide band ports for sending and receiving wide band information, a common control for responding to requests for service and including central processor means for producing connection commands for setting up connections between the narrow band ports and between the wide band ports, a narrow band highway having a plurality of time slots for the respective narrow band ports for carrying coded information associated with said ports, narrow band network means connected to the narrow band highway and including an information memory and a related first connection memory having a plurality of memory locations associated with the respective narrow band ports for receiving and storing connection commands from the central processor to effect selective switching of information between said time slots to connect the narrow band ports, a plurality of wide band channels carrying coded information associated with the respective wide band ports, wide band network means including space switching means and a related second connection memory having a plurality of memory locations associated with the respective wide band ports for receiving and storing connection commands from the central processor means to effect selective switching of information between the channels to connect the wide band ports, means responsive to the connection commands stored in the respective connection memories for controlling the information memory and the space switching means respectively to make connections in the respective networks under the control of said common control.

8. The switching system as set forth in claim 7 wherein the information memory includes means for sequentially receiving coded information from the respective narrow band ports in time slots assigned thereto as the narrow band highway, the connection memory having a location for each time slot for storing the address of a connected time slot, and means causing the readout of the information memory at the address stored in the connection memory for effecting communication between the narrow band ports assigned to the respective time slots.

9. The switching system as set forth in claim 7 wherein the second connection memory includes a plurality of addressable storage locations, respective ones of which are associated with the respective wide band ports, the space switching means including a plurality of multiplex means for receiving as input coded information for switching from all of said wide band ports and connecting a selected one of said inputs to an associated wide band port, and means coupling said second connection memory to said multiplex means for selecting the particular input to be switched to said associated wide band port.

10. The switching system as set forth in claim 9 wherein the connection memory comprises a plurality of digital storage circuits, individual ones of said storage circuits being associated with the respective multiplex means for addressing said multiplex means to select said particular input to be switched through said multiplex means.

11. The switching system as set forth in claim 10 including means for selectively addressing the digital storage means for accepting data from the common control, whereby the common control writes a particular address in the storage means for selectively establishing connections between the wide band access ports.

12. The switching system as set forth in claim 9 wherein at least some of said wide band ports are adapted for bidirectional communication producing an input signal to the wide band network for switching and receiving an output signal switched through the wide band network, means coupling said input signal to a plurality of said multiplex means as inputs thereto, means coupling the output of the associated multiplex means to said wide band port as said output signal, whereby input and output signals for said ports are separately switched in the wide band network.

13. The switching system as set forth in claim 7 including means for interfacing the common control with the respective connection memories, said interface means including address means for addressing a particular location in one of the connection memories and data means for providing the digital address of a connected channel for storage in said addressed location, thereby to set up a connection in said network.

14. The switching system as set forth in claim 7 including a plurality of code converters connected to the ports for converting between analog signals at said ports and digital words representative thereof for switching, the code converters associated with the narrow band ports having a first channel sampling rate and those associated with the wide band ports having a second sampling rate, the respective sampling rates being at least about twice the highest frequency in the respective frequency bands.

15. The switching system as set forth in claim 14 wherein the narrow band network includes means for assigning time slots to the narrow band ports and arranging the digital words associated with said ports in their respective time slots on the narrow band highway, the information memory including means for storing the digital words from the respective time slots in associated memory locations, the first connection memory including means for addressing the information memory for readout of samples from connected time slots, thereby to swap samples between connected time slots for effecting connections therebetween.

16. The switching system as set forth in claim 14 wherein the wide band network includes a plurality of multiplex means having inputs and outputs connected to the code converters, the second connection memory including means for addressing the multiplex means to pass digital words from a selected input to a selected output, thereby to connect the associated wide band ports.

17. The switching system as set forth in claim 16 wherein the connection memory comprises a plurality of storage means associated with the respective multiplex means for storing the address of a connected party thereby to maintain a connection between a selected input and the output of the multiplex means.

18. A switching system for controlling connections among a first group of access ports operating in a first frequency range and a second group of access ports operating in a second frequency range, said access ports adapted to pass analog signals, the maximum frequency of said signals for said first group being substantially higher than that of the second group, said switching system comprising in combination, first and second code converter means coupled to the first and second groups of access ports respectively for making a code conversion between the analog signals and digital signals representative thereof, said first and second code converter means having respective sampling frequencies sufficient to reproduce the sampled signals in the respective frequency ranges, a time division multiplex network for switching the digital signals associated with the second group of access ports thereby to make connections between said ports associated therewith, a space division network for switching the digital signals associated with the first group of access ports thereby to make connections between the ports associated therewith, means including a common control having a central processor for producing connection commands and routing said commands to the respective networks to selectively set up connections therein, and connection memory means in the respective networks having a plurality of memory locations associated with the access ports for receiving and storing said connection commands from the central processor to effect connections in the respective networks.

19. A telecommunications switching system for signals in two frequency ranges comprising in combination, a first group of ports for servicing information signals in a first frequency range, a second group of ports for servicing information signals in a second frequency range, one of said ranges including frequencies substantially higher than the other, a first digital network compatible with the first frequency range for selectively making connections between the first group of ports, a second digital network compatible with the second frequency range for selectively making connections between the second group of ports, means including a common control having a central processor for setting up connections in the respective networks, and connection memory means in the respective networks having a plurality of memory locations associated with said ports for receiving and storing connection commands from the central processor to set up said connections.

* * * * *

UNITED STATES PATENT AND TRADEMARK OFFICE
CERTIFICATE OF CORRECTION

PATENT NO. : 4,257,119
DATED : March 17, 1981
INVENTOR(S) : Satyan G. Pitroda

It is certified that error appears in the above—identified patent and that said Letters Patent is hereby corrected as shown below:

Column 11, line 30, "232" should be --233--.

Column 12, line 43, "unitl" should be --until--.

Signed and Sealed this

Second Day of June 1981

[SEAL]

Attest:

RENE D. TEGTMEYER

Attesting Officer

Acting Commissioner of Patents and Trademarks